Aug. 9, 1966 O. M. STUETZER 3,265,970
ELECTRICAL INPUT MEASURING DEVICE USING ION DRAG
PUMPS AND PRESSURE INDICATION
Filed May 28, 1962

INVENTOR.
OTMAR M. STUETZER
BY
Allen M. Sutton
ATTORNEY

United States Patent Office 3,265,970
Patented August 9, 1966

3,265,970
ELECTRICAL INPUT MEASURING DEVICE USING ION DRAG PUMPS AND PRESSURE INDICATION
Otmar M. Stuetzer, Hopkins, Minn., assignor, by mesne assignments, to Litton Systems, Inc., Beverly Hills, Calif., a corporation of Maryland
Filed May 28, 1962, Ser. No. 198,168
4 Claims. (Cl. 324—92)

This invention relates to devices for measuring electrical quantities and, more particularly, to such devices that are especially suited for measuring relatively high voltages and relatively small currents.

The present invention provides an electrical measuring device, whose operation is based on the principles of ion drag. These principles teach that, when ions in a perfectly ionized medium move under the influence of an electric field, friction with the carrier medium transfers momentum to the latter. If ions of only one polarity are present, appreciable pressure may be created by this means. Because the carrier medium must be ionized, it follows that it must have low inherent conductivity.

Applying ion drag principles to pressure generation involves increasing the concentration of ions present in a nearly insulating liquid. The increased concentration of ions is accelerated by an electric field and under its effect the ions move in one relative direction. As they move, the ions frictionally engage molecules of the insulating liquid and drag them in a direction approximately parallel to the lines of force of the electric field. Thus, momentum is imparted to the liquid and pressure is generated.

The means for increasing the concentration of ions in the liquid and causing the ions to move under the influence of an electric field generally comprises one or more emitter electrodes and one or more collector electrodes, with a source of high potential connected between the emitter and collector electrodes. This arrangement actually constitutes an ion drag pump, operating in an insulating liquid within a closed flow path, so that pressure is built up in the liquid rather than the liquid being pumped as would be the case in an open flow path. The ion drag pump may be of the type described in a paper by Otmar M. Stuetzer, entitled Ion Drag Pumps, published in the Journal of Applied Physics, vol. 31, No. 1, 136–146, January 1960.

According to the present invention, the electrical quantity to be measured is connected to energize the ion drag pump. As previously stated, the ion drag pump is located in an insulating liquid which substantially fills a closed flow path. A pressure-transmitting connection is provided between the flow path and pressure measuring means, such as a manometer or other instrument.

In one embodiment of the invention, in which a manometer is used as the pressure measuring instrument, the walls of the manometer are shaped to give an indication of pressure that is linear with respect to voltage applied to the ion drag pump.

In another embodiment of the invention, a pair of ion drag pumps are arranged in opposition to create a pressure differential in the liquid. The two ion drag pumps may be adapted to create a pressure differential that is linear with respect to voltage applied to the ion drag pumps, so that no special shape is required for the walls of the manometer.

The invention, together with various objectives and advantages, will be better understood by reference to the following description, taken in conjunction with the accompanying drawing, in which.

As used herein, the term "insulating liquid" includes both those liquids that are truly insulating and those that are poorly conducting. Examples of such liquids are lubricating oil, machine oil, silicone oil, castor oil, octane and kerosene, to name but a few.

The theory of pressure build up under unipolar ion conduction is presented in detail in a paper by Otmar M. Stuetzer, entitled Ion Drag Pressure Generation, published in the Journal of Applied Physics, vol. 30, No. 7, 984–994, July 1959. Because of that treatment, which is incorporated by reference in this application, the various equation derivations involved will not be detailed here.

In the aforementioned paper, the following equation for the pressure P created by an ion drag pump is derived:

$$P = k(U - U_0)^2 = k'I \qquad (1)$$

where U is the voltage to be measured, I is the current, $k$ and $k'$ are constants which have been computed and set forth in Table I of the paper, and $U_0$ is a correction quantity which depends primarily on the sharpness of the emitter electrode point or points used. Thus, any pressure gauge or manometer which transforms pressure into a readable indication can be calibrated in terms of voltage applied to or current flowing through the ion drag pump. However, it is seen that, while the pressure varies linearly with the current, it varies in accordance with a quadratic function with respect to the applied voltage. Therefore, it is desirable to provide means for linearizing the response with respect to applied voltage.

Figure 1:
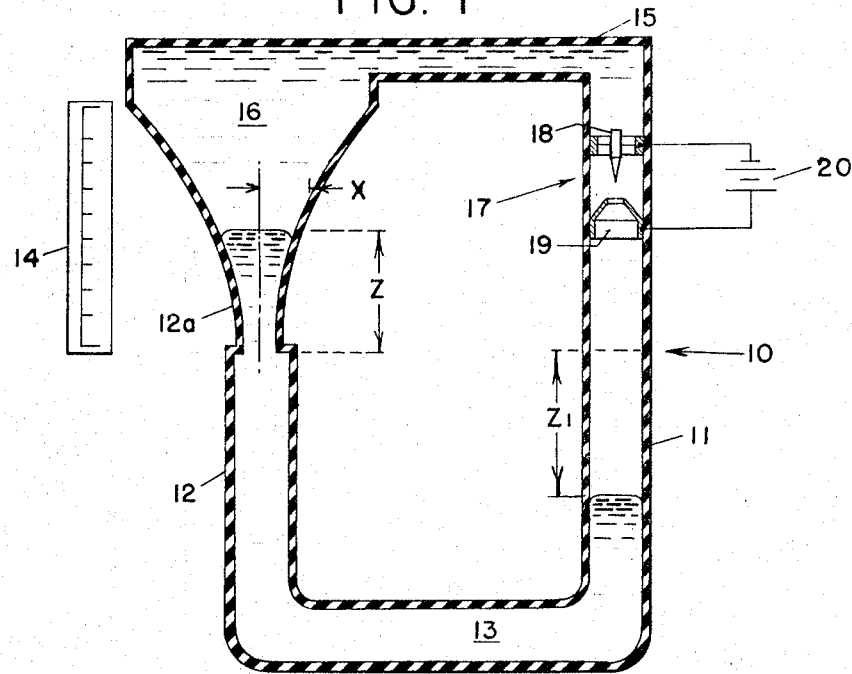
FIG. 1 is a sectional diagrammatic view of one embodiment of the invention.

FIG. 1 illustrates an embodiment of the invention which is adapted to give a linear pressure response with respect to applied voltage. The measuring device comprises pressure measuring means shown as a U-shaped manometer, indicated generally by the numeral 10. The manometer 10 includes legs 11 and 12, with the upper portion 12a of the leg 12 having a flared shape. The manometer 10 contains a fluid 13, which is preferably heavy so that the legs of the manometer need not be of undue length; a typical fluid for such use is mercury.

In the conventional mode of operation of the manometer 10, the leg 11 is connected to the source of pressure that it is desired to measure. The pressure exerted on the fluid 13 in the leg 11 causes the fluid to rise in the leg 12 and its degree of rise may be read from a scale 14 positioned adjacent the leg 12.

In accordance with the present invention, pressure is created on the fluid 13 in the leg 11 of the manometer by the pressure created in an insulating liquid contained in a closed flow path, when an ion drag pump in the liquid is energized by the voltage to be measured. In the present case, the closed flow path for the insulating liquid is defined by a conduit 15 connecting the ends of the legs 11 and 12 of the manometer 10. The conduit 15 may be made integrally with the manometer 10 or be made separately and assembled by conventional means. The conduit 15 is substantially filled with an insulating liquid 16, such as one of those previously mentioned. In practice, it has been found desirable to use a viscous fluid such as castor oil in order to prevent instability in operation.

Pressure is created on the fluid in the leg 11 of the manometer by means of an ion drag pump, shown generally by the numeral 17, located in the insulating fluid 16 in the conduit 15. The ion drag pump 17 includes a pointed emitter electrode 18 and a frusto-conical collector electrode 19. When a voltage source 20, whose value is to be measured, is connected between the emitter electrode 18 and the collector electrode 19, pressure is exerted on the fluid 13 in the leg 11 of the manometer. This occurs because ions are created in the insulating fluid 16 adjacent the tip of the pointed emitter electrode 18, which ions are attracted toward the collector electrode 19. As the ions move under the influence of the electric field existing between the two electrodes, they collide with molecules of the insulating liquid 16 and drag those molecules along with them toward and through the collector electrode 19. Because the liquid 16 is contained in a closed flow path, pressure is built up in the insulating liquid 16 in the conduit 15, which is transmitted to the manometer 10. This effect is considered in detail in the technical papers previously referenced.

When pressure is exerted by the ion drag pump 17, the height of the column of liquid 13 in the leg 11 of the manometer will be decreased by an amount $Z_1$, and the height of the liquid in the leg 12 will be increased by an amount Z. It is clear from Equation 1 that $(Z_1+Z)$ will always be a quadratic function of the applied voltage. Z alone, however, can be linearized by giving the walls of the manometer a flared out shape, as indicated at 12a. In practice, the correct shape for the walls of the flared portion 12a of the manometer is usually determined empirically by trial and error methods. If we assume that the walls are only shaped perpendicularly to the plane of the drawing, and the boundaries parallel to the plane of the drawing are planes, it turns out that the walls are straight rather than curved as illustrated. In that case, the following equation may be used:

$$X = C_1 Z - C_2 \quad (2)$$

where Z and X are the distances shown in FIG. 1, and $C_1$ and $C_2$ are constants which depend in a simple way on the densities of the manometer fluid 13 and the pumping fluid 16 and on the diameter of the unflared portion of the manometer 10.

It has been found that the electrical measuring device of the invention will conveniently measure voltages ranging from 2,000 to 100,000 volts. The primary practical limitation on the upper limit of voltages that may be measured is the danger of break-down of the insulating liquid between the two electrodes of the ion drag pump. The particular insulating liquid used may be indicated by the application of the device.

One of the outstanding advantages of the measuring device is that the ion drag pump portion of the apparatus and the pressure measuring portion may be made separately and located at any desired distance apart. Thus, the closed flow path for the insulating liquid might comprise a conduit sealed at both ends and containing the insulating liquid and the ion drag pump. That combination might be located at the source of the high voltage to be measured and be connected to the pressure measuring apparatus by means of a simple pressure line. The elimination of electrical connections between the source of high voltage and the measuring device is often quite desirable.

Figure 2:
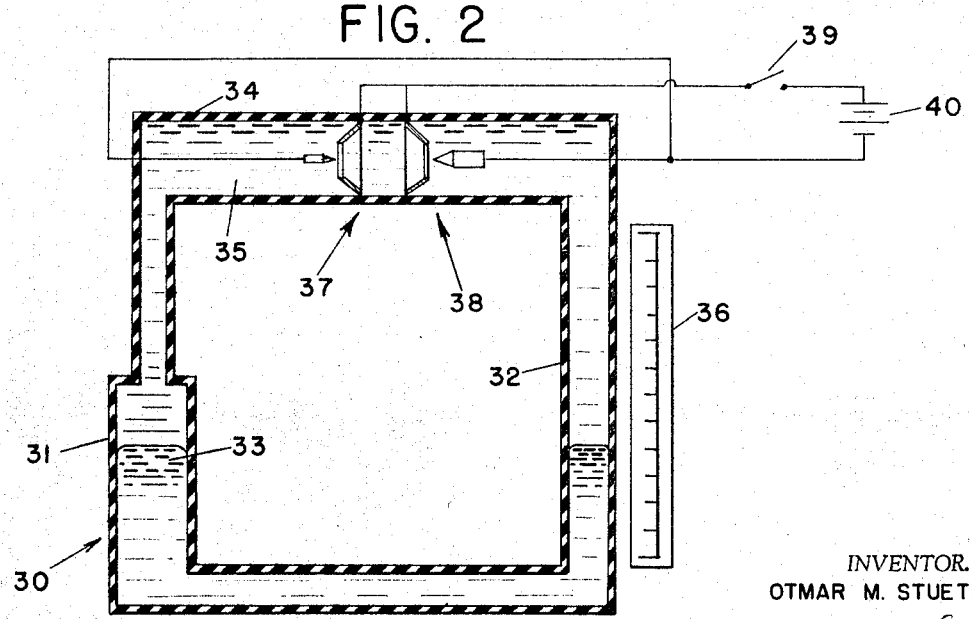
FIG. 2 is a sectional diagrammatic view of another embodiment of the invention.

FIG. 2 illustrates an embodiment of the invention, which does not require that the pressure measuring device be specially shaped to compensate for the quadratic response of pressure with respect to applied voltage. The device comprises a manometer 30 having legs 31 and 32 and containing a dense fluid 33. The ends of the U-shaped manometer 30 are connected by a conduit 34 which thus defines a closed flow path for an insulating fluid 35. The reading of the manometer may be indicated on a suitable scale 36 located adjacent the leg 32 of the manometer.

In accordance with the invention, two ion drag pumps 37 and 38 are located in the insulating liquid 35 in the conduit 34. The ion drag pumps 37 and 38 are arranged to oppose each other, so that a pressure differential resulting from that opposition will be applied to the manometer 30. As will be pointed out, the pressure differential is linear with respect to the voltage applied to the two ion drag pumps connected in parallel.

When the ion drag pumps 37 and 38 are electrically connected in parallel, the pressures $P_1$ and $P_2$, respectively, which are created in the insulating liquid 35 by the pump may be written as $$P_1 = k(U - U_{10})^2 \quad (3)$$

and $$P_2 = k(U - U_{20})^2 \quad (4)$$

where $k$ is a constant as computed in the previously referenced paper, U is the voltage applied to the two ion drag pumps and $U_{10}$ and $U_{20}$ are correction quantities which depend mainly on the sharpness of the pumping points of the pumps 37 and 38, respectively. If now the pumps 37 and 38 are connected in opposition, then the pressure differential $P_d$ becomes $$P_d = P_1 - P_2 = k(U - U_{10})^2 - k(U - U_{20})^2 \quad (5)$$

which may be reduced to $$P_d = k[2U(U_{20} - U_{10}) + (U_{10}^2 - U_{20}^2)] \quad (6)$$

It is seen from Equation 6 that the pressure differential $P_d$ varies as a linear function of the applied voltage U. Thus, it is necessary only to fashion the pointed emitter electrodes of the two ion drag pumps 37 and 38 somewhat differently so that the correction quantities $U_{10}$ and $U_{20}$ are different, in order to obtain a reading from the manometer 30 which is linear with respect to the voltage applied to the ion drag pumps. The pointed emitter electrodes of the pumps are shown in FIG. 2 as being of different size in order to indicate diagrammatically that they have different characteristics and, therefore, different correction factors. The distances of the two points from their respective collector electrodes should be the same, however.

As shown in FIG. 2, the measuring device is not energized, and the heights of the columns of liquid 33 in the two legs of the manometer are equal. If, however, the ion drag pumps 37 and 38 are connected in parallel through a switch 39 to a voltage source 40 that it is desired to measure, and the switch 39 is closed, the heights of the manometer liquid columns will change in accordance with the voltage. If it is assumed that the pumps 37 and 38 are so designed that the correction factor $U_{20}$ for the pump 38 is larger than the correction factor $U_{10}$ for the pump 37, the pressure exerted by the pump 38 will be greater than that exerted by the pump 37. Therefore, the pressure in the insulating fluid 35 will be greater to the left of the pump 37 (as seen in the drawing) than will be the pressure in the liquid to the right of the pump 38. Thus, the pressure differential will be applied to the manometer to lower the height of the liquid column in the leg 31 of the manometer and increase the height of the liquid column in the leg 32. The increase in the height of the liquid column in the leg 32, as has been pointed out, is linear with respect to the value of the applied voltage. The scale 36 may thus be suitably calibrated in linear fashion to indicate the value of the voltage of the source 40. The range of voltages that may be measured by the embodiment of the invention shown in FIG. 2 is subject to the same conditions as previously noted for the embodiment shown in FIG. 1.

The device shown in FIG. 2 may be easily adapted to measure current by merely disconnecting the ion drag pump 37. The device will then operate according to Equation 1, which states that the pressure created by an ion drag pump is linear with respect to current through the pump. Thus, the scale 36 may be replaced by another which is calibrated in terms of current.

The device shown in FIG. 2 embodies the same advantages as that shown in FIG. 1. The closed flow path containing the insulating liquid and the two ion drag pumps may be physically separated from the pressure measuring portion of the apparatus and connected to it only by a simple pressure transmitting line.

Electrical measuring devices constructed according to the invention are simply designed, rugged, and inexpensive to manufacture. Useful readable indications may be obtained with currents well below a microampere and high voltages may be measured with ease and safety.

Although two embodiments of the invention have been illustrated and described, it is apparent that many changes and modifications may be made by one skilled in the art without departing from the true spirit and scope of the invention.

What is claimed is:

1. A device for measuring an electrical quantity comprising pressure measuring means, means defining a closed flow path for an insulating liquid, an insulating liquid substantially filling said closed flow path, a pair of differential ion drag pumps positioned in said insulating liquid arranged in opposition and effecting thereby opposed independent ion drags on said insulating liquid when said pumps are energized, means for connecting the electrical quantity to be measured to energize both said ion drag pumps to provide a pressure differential in said liquid by the differences in drag pressures created thereon by said differential drag pumps, and means for transmitting said pressure differential to said pressure measuring means.

2. A device for measuring an electrical quantity comprising a U-shaped manometer for measuring pressure, a conduit forming a closed flow path and connecting the ends of said U-shaped manometer, an insulating liquid substantially filling said conduit, a pair of differential ion drag pumps positioned in said insulating liquid arranged in opposition for creating a fluid pressure differential on said manometer by the differences in ion flow effected by said ion pumps on said liquid, and means for connecting the electrical quantity to be measured to energize both said ion drag pumps electrically connected in parallel.

3. The device defined in claim 2, wherein said ion drag pumps are adapted to create a pressure differential that is linear with respect to voltage applied to said ion drag pumps.

4. Apparatus for measuring unknown voltages, which comprises:

a tube;

insulating fluid in said tube;

first ion drag pump means including an emitter electrode and a collector electrode displaced longitudinally in said tube from said emitter electrode for producing a force on said fluid which varies non-linearly with respect to a voltage applied to said electrodes;

means for modifying said non-linear force to provide a fluid displacement indication which is linear with respect to a voltage applied to said electrodes, said means including second ion drag pump means for producing a force on said fluid in opposition to said force produced by said first ion drag pump means, and means for applying said unknown voltage to the electrodes of said first and second ion drag pump means to indicate the value of said unknown voltage.

References Cited by the Examiner

UNITED STATES PATENTS

| 1,590,451 | 6/1926 | Slepian | 324—93 |
| 2,416,978 | 3/1947 | Burgess | 324—94 |
| 2,451,724 | 10/1948 | Evans | 324—92 |
| 2,802,918 | 8/1957 | Boyle | 103—1 |

OTHER REFERENCES

"Principles of Electricity," by Harrwell, McGraw-Hill, 1938, pp. 70 and 75 relied on.

WALTER L. CARLSON, *Primary Examiner.*

FREDERICK M. STRADER, *Examiner.*

R. V. ROLINEC, *Assistant Examiner.*